United States Patent [19]

Persson

[11] 4,304,444

[45] Dec. 8, 1981

[54] BEARING MEANS IN ROTARY DRILL BITS

[75] Inventor: Erik A. Persson, Sandviken, Sweden

[73] Assignee: Sandvik Aktiebolag, Sandviken, Sweden

[21] Appl. No.: 129,424

[22] Filed: Mar. 12, 1980

[30] Foreign Application Priority Data

Mar. 19, 1979 [SE] Sweden .................................. 7902420

[51] Int. Cl.³ ............................................. F16C 17/10
[52] U.S. Cl. ..................................... 308/8.2; 175/371
[58] Field of Search .................... 308/8.2, 78, 240, 97; 175/371, 372

[56] References Cited

U.S. PATENT DOCUMENTS

| 4,145,094 | 3/1979 | Vezirian ............................... 308/8.2 |
| 4,190,301 | 2/1980 | Lachonius et al. ................... 308/8.2 |
| 4,206,952 | 6/1980 | Olschewski et al. ................ 308/8.2 |
| 4,252,383 | 2/1981 | Simpson ............................... 308/8.2 |

Primary Examiner—Lenard A. Footland
Attorney, Agent, or Firm—Burns, Doane, Swecker & Mathis

[57] ABSTRACT

A rotary drill bit comprising at least one roller cutter (12) which is rotatably supported over bearing means (14, 15, 16) and provided with cutting means (13). The bearing means comprises a radial friction bearing (16) with a bearing element (25) of wear resistant material, such as hard metal. In order to improve the surface contact between the bearing element (25) and the inner bearing surface (27) in the roller cutter (12), and in order to remove impurities from the cooperating bearing surfaces a longitudinal groove (30) is provided in the bearing element (25). The fluid primarily supplied for flushing the groove (30) is secondarily used to cool the bearing element (25).

10 Claims, 5 Drawing Figures

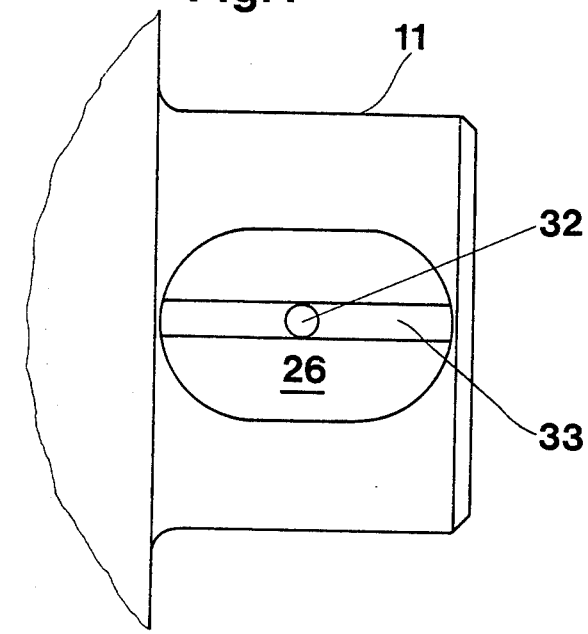
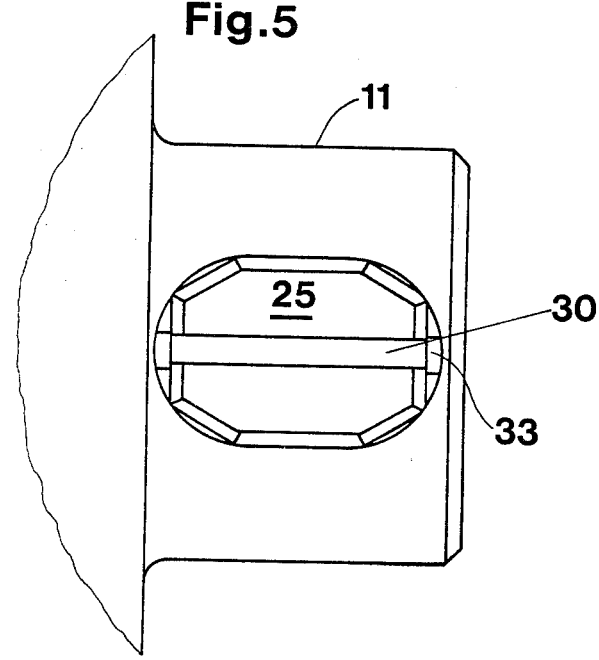

BEARING MEANS IN ROTARY DRILL BITS

The invention relates to a rotary drill bit of the type which comprises at least one bearing shaft which over bearing means rotatably supports a roller cutter provided with cutting means, such as hard metal inserts. The bearing means comprises at least one radial friction bearing including a bearing element of wear resistant material, such as sintered hard metal alloy. The bearing element is located at the side of the bearing shaft which faces the bottom of the hole being drilled by the drill bit. The bearing element is provided with a surface which is curved in the latitudinal direction of the bearing element and in the rotational direction of the roller cutter. The curved surface is adapted to cooperate with an inner bearing surface in the roller cutter. The invention further relates to a bearing shaft particularly intended to be used in a rotary drill bit of the above type.

The object of the present invention is to improve the surface contact between the bearing element and the bearing surface in the roller cutter cooperating therewith.

Another object of the invention is to ensure an efficient removal of wear products from the cooperating bearing surfaces, and, when a solid lubricant, such as silver, is applied in the bearing surface of the roller cutter in a manner known per se, a removal of surplus lubricant in order to avoid daubing thereof.

A further object of the invention is to efficiently cool the bearing element in order to make possible, particularly in blast hole drilling, applying of high feeding forces without causing unacceptable high bearing temperature to be generated.

The invention is described in detail in the following description with reference to the accompanying drawings in which one embodiment is shown by way of example. It is to be understood that this embodiment is only illustrative of the invention and that various modifications thereof may be made within the scope of the claims following hereinafter.

In the drawings,

FIG. 4 shows a view of the bearing shaft in FIG. 1 seen from below.

FIG. 5 shows a view of the bearing shaft in FIG. 1 seen from below where a bearing element is located in a recess in the bearing shaft.

Figure 1:
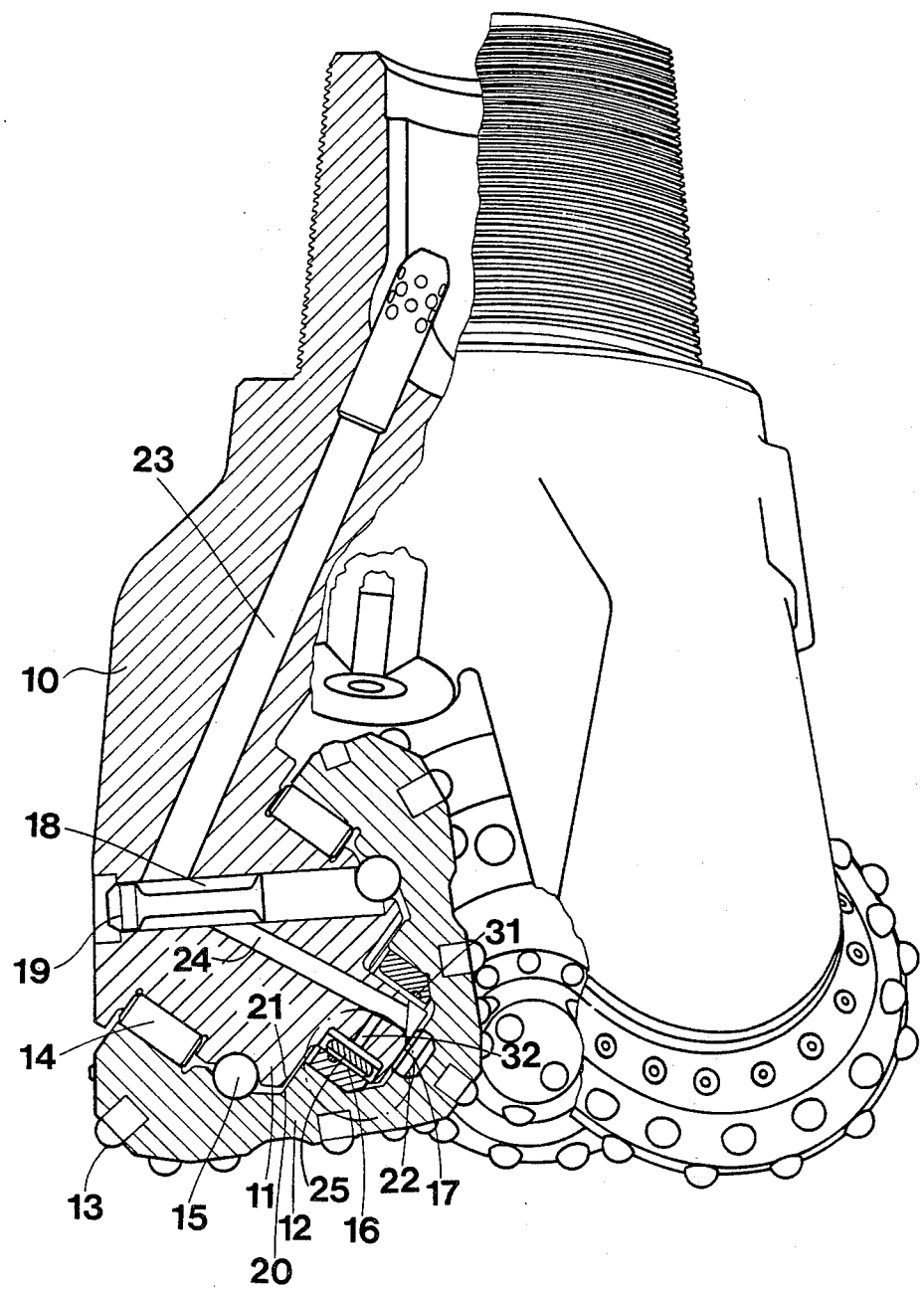
FIG. 1 shows a rotary drill bit according to the invention, partly as a side view, partly in vertical section.
Figure 2:
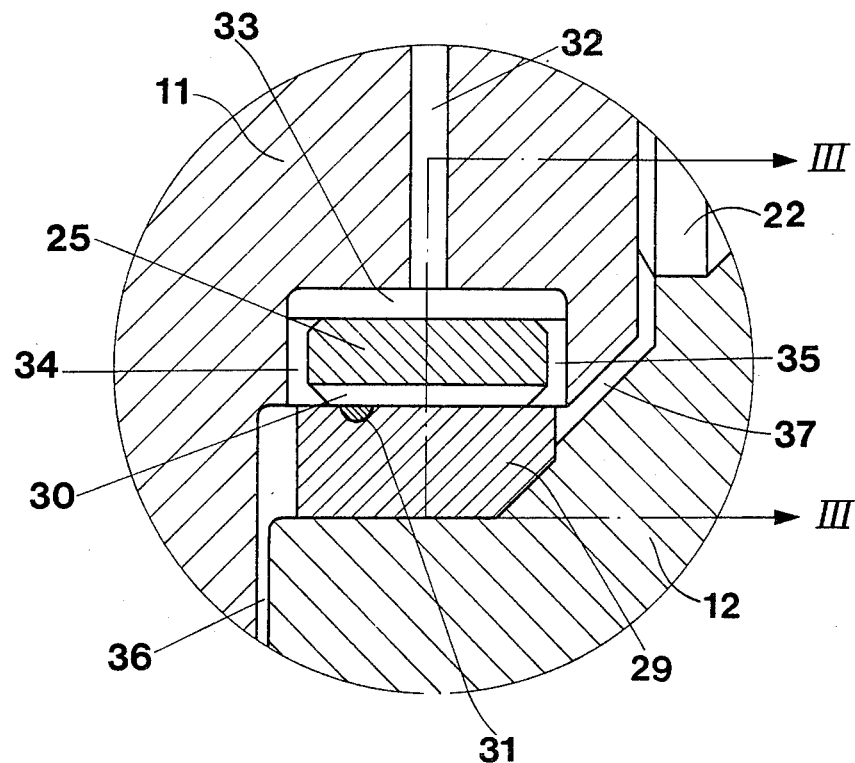
FIG. 2 shows in an enlarged scale the encircled portion in FIG. 1.

FIG. 1 shows a roller bit for rotary drilling in rock and earth formations. The roller bit comprises three separate legs which form a bit head 10. For the sake of clarity, only one leg is shown in section, the lowermost portion of which forms a bearing shaft 11 upon which a roller cutter 12 is rotatably mounted. The roller cutter 12 carries cutting means 13, such as hard metal inserts, which are mounted in conventional manner thereon so as to break up and crush rock formations when the bit is rotated and moved downwards through the hole being drilled.

The bearing means required for the rotatable supporting of the roller cutter 12 comprises a system of roller bearings 14, a system of ball bearings 15, a radial friction bearing 16 and an axial bearing 17. The separate ball bearings in the ball bearing system 15 are inserted through a ball loading bore 18 in the bearing shaft 11. Upon completed insertion, the separate ball bearings are retained by means of plug 19 which is inserted into the bore 18. The plug 19 is secured in the bore 18, preferably by welding. The radial forces acting on the roller cutter 12 are mainly transferred to the bearing shaft 11 via the cylindrical bearing 14 and the radial friction bearing 16 while the main task of the ball bearing 15 is to retain the roller bit 12 on the bearing shaft 11. The axial forces acting on the roller cutter 12 are mainly transferred via the axial bearing 17; however, a part thereof can be transferred from a thrust surface or shoulder 20 on the roller cutter 12 to a thrust surface or shoulder 21 on the bearing shaft 11.

The axial bearing 17 comprises a support plate or thrust button 22 which is pressed into the top of the roller cutter 12 and which is applied in supporting abutment against the axial end surface of the bearing shaft 11. Usually, the thrust button 22 as well as the bearing shaft 11 is made of hardened steel while a hard-facing material, such as Stellite, is applied on the axial bearing surface of the shaft 11.

Cooling fluid, such as compressed air, is supplied to the axial bearing 17 through channels 23, 24.

Figure 3:
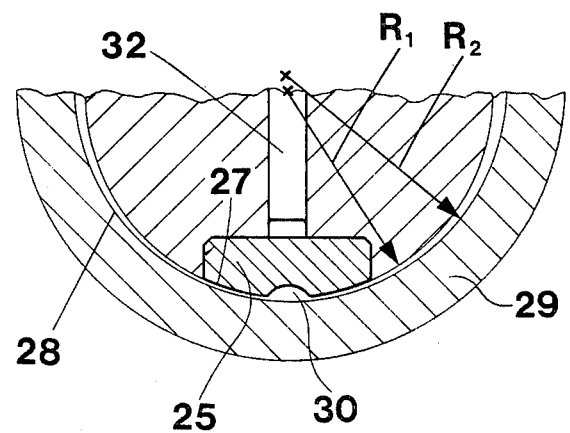
FIG. 3 is a section taken on the line III—III in FIG. 2.

According to the invention, a bearing element 25, FIG. 5, of wear resistant material, such as sintered hard metal alloy, is mounted in a recess 26, FIG. 4 in the bearing shaft 11 at the distal end thereof having reduced diameter. The bearing element 25 is located at the side of the bearing shaft 11 facing the bottom of the hole being drilled by the roller bit. The bearing element 25 is provided with a surface 27, FIG. 3, which is curved in the latitudinal direction of the bearing element 25 and in the rotational direction of the roller cutter 12. The curved surface 27 is designed for cooperation with an inner bearing surface 28 in the roller cutter 12. In the preferred embodiment, the bearing surface 28 is formed on a journal bushing 29 which is pressed into a corresponding bore in the roller cutter 12.

According to the invention the journal bushing 29 is made of powder metallurgical high-speed steel by compaction and subsequent sintering of small steel pellets which gives a fine structure in comparison with conventional high-speed steels due to the fact that the hardness determining substances, preferably carbides such as tungsten carbide, appear in granular form instead of in more or less elongate paths as in conventional high-speed steels.

Due to the fact that the structure of the powder metallurgical high-speed steel reminds of the structure of sintered hard metal alloy, the journal bushing 29, probably, alternately may be made of hard metal, preferably of a hard metal quality having lower hardness than the hard metal in the bearing element 25.

In the preferred embodiment the radius $R_1$ of the curved surface 27 of the bearing element 25 is somewhat smaller than the radius $R_2$ of the inner bearing surface 28 of the journal bushing 29. According to the invention a groove 30 is formed in the curved surface 27 of the bearing element 25. The groove 30 extends in the longitudinal direction of the bearing element 25. In the preferred embodiment, then, the groove 30 is arranged along the tangent line between the curved surface 27 of the bearing element 25 and the inner surface 28 of the journal bushing 29. Due to the groove 30 the surface contact between the bearing element 25 and the journal bushing 29 is improved.

In the preferred embodiment silver is applied in a manner known per se in a helical groove 31 in the bearing surface 28. Instead of silver some other soft anti-galling or friction reducing material, such as silver alloy, may be used. According to the invention it is ensured due to the groove 30 that wear products from the bearing surfaces 27, 28 are efficiently removed. Due to the groove 30 it is also ensured that the bearing surfaces 27, 28 are cleaned from surplus of silver in the groove 31, thereby avoiding daubing of silver. For purposes of supplying the required flushing fluid, in the preferred embodiment compressed air, to the groove 30 a transverse channel 32 is provided in the bearing shaft 11. The channel 32 connects the channel 24 to a passage 33 which is provided at the contact surface between the bottom of the recess 26 and the bearing element 25. In the illustrated embodiment the passage 33 is formed in the bearing shaft 11; alternatively, the passage 33 may be formed in the bearing element 25. Compressed air through the channels 24, 32, 33 is supplied to the groove 30 via openings 34, 35 at the transverse or short ends of the bearing element 25. Impurities in the groove 30 are removed through clearances 36, 37 between the bearing shaft 11 and the roller cutter 12.

The rotary drill bit according to the present invention is particularly intended to be used in blast hole drilling where high feeding forces are applied on the bit. According to the invention the channels 32, 33, the openings 34, 35 and the groove 30 ensure that the bearing element 25 is efficiently cooled due to the fact that all surfaces of the bearing element are exposed to direct cooling of the flushing air. The invention, however, may be applied in all types of rotary drill bits. For instance, a bearing element of the improved type may be used in the larger radial bearing in drill bits where the cylindrical bearing 14 is replaced by a friction bearing.

We claim:

1. A rotary drill bit comprising a head, at least one bearing shaft on said head, a roller cutter rotatably mounted on said bearing shaft, said roller cutter carrying cutting means, bearing means for rotatably supporting said roller cutter on said bearing shaft, said bearing means comprising at least one radial friction bearing, said radial friction bearing having a bearing element of wear resistant material, such as sintered hard metal alloy, said bearing element being located at the side of said bearing shaft which faces the bottom of the hole being drilled by the drill bit, said bearing element being provided with a surface which is curved in the latitudinal direction of the bearing element and in the rotational direction of the roller cutter whereby being adapted to cooperate with an inner bearing surface in the roller cutter, characterized in that the curved surface of the bearing element is provided with a groove which extends in the longitudinal direction of the bearing element.

2. A drill bit according to claim 1, wherein the groove extends to at least the one end of the bearing element.

3. A drill bit according to claim 1 or 2, wherein the groove is located along a tangent line between the curved surface of the bearing element and the inner bearing surface of the roller cutter.

4. A drill bit according to claim 3, wherein the radius ($R_1$) of the curved surface of the bearing element is somewhat smaller than the radius ($R_2$) of the inner bearing surface of the roller cutter.

5. A drill bit according to claim 1 wherein the bearing element is located in a recess in the bearing shaft at the distal end thereof having a reduced diameter, and wherein a passage is arranged at the contact surface between the bottom of said recess and the bearing element, said passage extending in the longitudinal direction of the bearing element and communicating on the one hand with a flushing channel in the roller bit and on the other with the groove in the curved surface of the bearing element, said flushing channel supplying pressure fluid to the bearing means for flushing thereof.

6. A drill bit according to claim 1 wherein a friction reducing material, such as silver or silver alloy, is filled in at least one groove in the inner bearing surface of the roller cutter.

7. A drill bit according to claim 6, wherein the groove is helical.

8. A bearing shaft forming part of a rotary drill bit of the type defined in claim 1 and over bearing means rotatably supporting a roller cutter carrying cutting means, such as hard metal inserts, said bearing means comprising at least one radial friction bearing having a bearing element of wear resistant material, such as sintered hard metal alloy, which is located at the side of the bearing shaft which faces the bottom of the hole being drilled by the drill bit, said bearing element being provided with a surface which is curved in the latitudinal direction of the bearing element and in the rotational direction of the roller cutter whereby said curved surface is adapted to cooperate with a bearing surface in the roller cutter, and said bearing shaft being provided with a recess at its distal end having reduced diameter for accomodating the bearing element, characterized in that at least a first passage is provided in the bearing shaft for supplying cooling fluid, such as compressed air to the bottom of the recess.

9. A bearing shaft according to claim 8, wherein said first passage terminates into a second passage, which extends in the axial direction of the roller cutter at the bottom of the recess.

10. A bearing shaft according to claim 9, wherein the axial extent of the bearing element is somewhat smaller than the axial extent of the recess, said second passage extends to at least the one short end of the bearing element and wherein said second passage at said short end is arranged to communicate with a groove in the curved surface of the bearing element, said groove extending in the longitudinal direction of the bearing element.

* * * * *